Sept. 11, 1923.                                       1,467,461
                      H. E. R. VOGEL
                  CAPILLARY VISCOSIMETER
                   Filed May 22, 1922
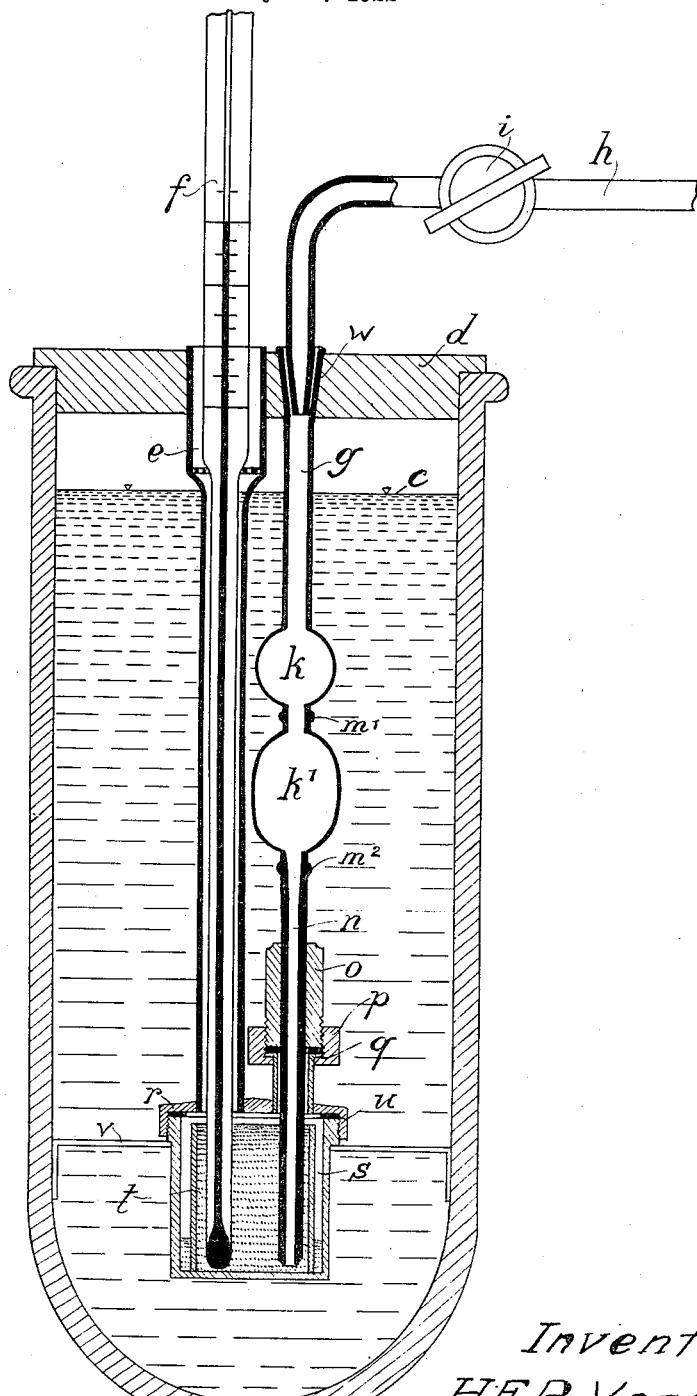
Inventor:
H.E.R. Vogel.
By Marks&Clerk
       Attys.

Patented Sept. 11, 1923.

1,467,461

UNITED STATES PATENT OFFICE.

HANS EDGAR RICHARD VOGEL, OF HAMBURG, GERMANY, ASSIGNOR TO THE FIRM: OELWERKE STERN-SONNEBORN A. G., OF HAMBURG, GERMANY.

CAPILLARY VISCOSIMETER.

Aplication filed May 22, 1922. Serial No. 562,910.

*To all whom it may concern:*

Be it known that I, HANS EDGAR RICHARD VOGEL, a citizen of the German State, residing at Hamburg, Germany, 29 Erlenkamp, have invented certain new and useful Improvements in Capillary Viscosimeters, of which the following is a specification.

The invention relates to a capillary viscosimeter, in which the measuring vessel with capillary outflow tube acting as the measuring chamber, has the form of a pipette and the outflow of the fluid to be tested out of the measuring chamber takes place through the capillary into the receiving chamber within the heating bath.

The capillary viscosimeters of this type, which have hitherto been in use for scientific and technical purposes, for instance those according to Ostwald's system, have considerable disadvantages, being very fragile, difficult to clean and are not suitable for accurate measurements of the viscous fluid at different temperatures, the reason being that the volume of the fluid and consequently the pressure varies on the temperature varying. Viscosimeters of other systems also have certain disadvantages. For instance viscosimeters of the Engler type have a value proportional to the viscosity only in the case of very viscous fluids, as the capillaries have such a wide bore and are so short that eddying predominates up to considerable viscosities. These viscosimeters are also not suitable for measuring at different temperatures, as they vary greatly with the temperature furthermore for carrying out measurements they require large quantities of fluid and the repetition of a measurement takes up a great deal of time, as, while the measurement is being made, the fluid leaves the temperature bath, so that for repeating the measurement the temperature has to be adjusted again.

These two types of the known viscosimeters have the further defect in common, that, owing to the complicated nature of the physical phenomena which takes place when carrying out the measurement, a simple conversion of the results obtained into degrees of another viscosimeter is not possible.

In the new viscosimeter forming the subject matter of the application, these defects are avoided by a suitable construction and the manner of using the apparatus. The new viscosimeter has a measuring chamber with an outflow capillary and a receiving chamber for the fluid flowing out of the measuring chamber through the capillary when a test is being made. The parts of the apparatus are in a heating bath which is adapted to be accurately regulated and set to the required temperature and through which an air outlet pipe leads from the receiving vessel to the outside. The continuity of the fluid is not interrupted when it is allowed to flow out. In this general arrangement and method of application the new viscosimeter is similar to other well-known apparatus, for instance that described by Ostwald, for determining directly the factor of viscosity. It differs from it, however, very considerably by its special construction, according to which an overflow arrangement is provided on the receiving vessel. By this means, by a portion of the expanded quantity of fluid overflowing when heated, the same fluid level is always automatically reset, thus facilitating measurement at different temperatures under similar conditions.

A further novel feature consists in this that the thermometer is not placed as usual, in the heating bath, but is taken through the air outlet tube and dips into the fluid to be measured. The ascertained temperature is that of the fluid to be tested. The capillary and the receiving vessel are made so as to be easily accessible for cleaning purposes by the provision of releasable connections and all the parts, with the exception of the capillary pipette, consist substantially of metal or other resistant materials, so that the main parts will not easily be damaged.

In the manner of application the essential difference from the similar well-known apparatus,—excepting that of Ostwald and that of Ubbelohde, in which for the measuring operation only a flow within the single capillary vessel takes place—consists in this, that in the new viscosimeter an outflow takes place from the measuring vessel into another vessel, the receiving vessel releasably connected with it. In this manner of application it is similar to the viscosimeters of Engler (in Germany and many other states), Redwood (in England) and Saybolt (in America), from which, however, it differs in this, that in spite of the outflow action there will be no interruption of the thread of fluid when the outflow takes place and the whole procedure takes place at the same temperature within the heating bath, the repetition of a measurement being thus facilitated.

The accompanying drawing shows a constructional example of the invention in vertical section:

In a vessel $a$, there is the heating bath $b$, filled with fluid up to $c$. Holes are provided in the cover $d$, in which the air outlet tube $e$ which acts at the same time as the sheath for the thermometer $f$, and the pipette $g$ are held. The pipette $g$ is provided at the top with a mouthpiece $h$ and below the latter with a cock $i$.

Below the cover $d$ the pipette $g$ has two enlargements, a smaller one $k$ and a larger one $k_1$ and two marks $m_1$ and $m_2$. Below $m_2$ is the capillary $n$ of about 7 cm. length and 1-2 mm. diameter.

A threaded part $o$ fits tightly on the capillary and is adapted to be releasably connected to the cover $r$ of the overflow vessel $s$ by a cap-nut $p$, a washer $q$ (for instance of lead) being inserted.

In the overflow vessel $s$ of greater diameter stands the receiving vessel $t$ of smaller diameter, into which the capillary $n$ and the thermometer $f$ dip, the latter being surrounded by the air outlet tube $e$, the lower end of which is tightly fitted to the cover $r$ of the overflow vessel $s$.

The cover $r$ of the overflow vessel $s$ is secured tightly onto the vessel $s$, a washer $u$ being inserted.

The apparatus is used as follows:—

The cover $r$ of the overflow vessel $s$ is screwed off and the receiving vessel $t$ filled to the brim with the fluid to be measured. Thereupon the cover $r$ is screwed on without the thermometer $f$ and the viscosimeter placed on the support $v$ in the heating bath $b$. Care should be taken to keep the apparatus steady, so as to avoid the spilling of any considerable quantity of liquid. The thermometer $f$ is thereupon introduced directly into the receiving vessel $t$ through the air inlet tube $e$. The fluid displaced by the thermometer $f$ flows out of the receiving vessel $t$ into the overflow vessel $s$, so that the level of the fluid adjusts itself automatically. The fluid is then brought to the required temperature, whereupon from the mouthpiece $h$, with the cock $i$ opened, the fluid is sucked into the enlargements $k_1$, and $k$ of the pipette $g$ and the cock $i$ is closed. When the measurement is commenced, the mouthpiece $h$ is withdrawn from the ground rack $w$ of the pipette $g$ and the fluid commences, owing to its own weight, to flow out of the enlargement $k$. Only when it has passed the mark $m_1$ the actual measurement commences by determining the time, within which the fluid runs down to the mark $m_2$. During this time the fluid in the pipette tube is in uninterrupted communication with the fluid already in the receiving vessel $t$. The air displaced in the vessel $t$ can escape freely through the tube $e$ to the atmosphere.

A special advantage of the new apparatus resides in the fact that by a simple sucking up again of the fluid that has run down into the receiving vessel $t$ into the pipette $g$ above the mark $m_1$, the test of the same fluid material, for instance, of the lubricating oil, may be repeated as often as desired, by determining the time taken for it to run down from the mark $m_1$ to the mark $m_2$. The experiment may be repeated without much trouble at a different temperature, if this is necessary for comparative tests or for other reasons. As further important advantages may be mentioned, that only a very small amount of the fluid to be tested is required, that the capillary can be readily taken out and cleaned or be replaced by a new one, that no specially graduated vessel is required for the fluid to be measured and that the pipette $g$ may be changed, for instance for one with a capillary $n$ of greater or smaller bore and with correspondingly larger or smaller enlargements $k$, $k_1$.

The greatest importance of the viscosimeter resides in the fact, that, owing to its peculiar construction, it is a compromise between the absolute and the practical viscosimeters and may consequently be used for determining the viscosity graduations of the viscosimeters used in the art, more particularly those of Enzler, Redwood and Saybolt. The construction is such that the values obtained at all temperatures with the new viscosimeter have a simple mathematical and physical relation, and may be represented by curves or tables, to the values of the other viscosimeters. These conversion curves or tables are determined once and for all for each apparatus, by a few comparative measurements and by using the mathematical relations, and are supplied with it. Thus, by means of the results of measurement with the new viscosimeter, every one is enabled, even if not conversant with mathematics to obtain mechanically from the corresponding curve the technical degrees of viscosity sought for.

For using the new viscosimeter in this special manner, it is necessary to determine the basic values for the degrees of heat prescribed for the other viscosimeters. This is foundation for the determination of conversion curves.

As in the new viscosimeter all the parts, with the exception of the capillary pipette, are made substantially of metal, the apparatus is adapted to withstand any rough usage and only the pipette which can easily be replaced is liable to be damaged in any way. Instead of metal, any other material having the same strength and heat resisting properties may of course be used.

I claim:—

1. In a capillary viscosity meter wherein the outflow of liquid to be tested from a measuring chamber takes place through a capillary tube projecting into a receiver arranged within a heating bath, the combination of a measuring chamber, a capillary outlet tube connected with said chamber and having the form of a pipette, a receiver into which the end of the pipette extends to a point adjacent to one end of the receiver, the latter being provided with an overflow device, a detachable connection between said pipette and the overflow vessel, and an air outlet pipe for the receiver and overflow vessel respectively.

2. In a capillary viscosity meter, the combination of a measuring chamber, a capillary outlet tube connected to said chamber and forming a pipette, a receiver in connection with the end of said pipette and provided with an air outlet pipe and an overflow device, a vessel containing liquid adapted to be heated and into which said pipette and said receiver with the overflow device extend, a closing stopper for said vessel through which the measuring chamber and the air outlet pipe extend, the measuring chamber being provided with two enlargements at points adjacent to said stopper, and the upper one of said enlargements being smaller than the lower one.

3. In a capillary viscosity meter, a vessel adapted to contain a liquid adapted to be heated, a measuring chamber arranged in the vessel and provided with a capillary tube, a receiver in connection with the end of the capillary tube, an overflow vessel which surrounds the receiving vessel with clearance, a removable cover for said vessel, and an air outlet pipe and a threaded part for releasably fixing the pipette attached to said cover.

4. A capillary viscosity meter of the kind defined by claim 3 in which the vessel is provided with a stopper through which the measuring chamber, the air outlet pipe and a thermometer extends, the latter within said air outlet pipe and extending into the receiver.

5. A capillary viscosity meter of the kind defined by claim 3 in which the measuring chamber is provided with a plurality of enlargements arranged between the capillary tube and the outer end of said measuring chamber.

6. In combination, a vessel adapted to contain a liquid to be heated, a stopper for said vessel, a measuring tube extending through said stopper and provided within the vessel with a plurality of enlargements and a capillary tube extending into the receiver, a valve provided in the measure tube exteriorly of the vessel, a receiver arranged in the vessel and into which the end of the capillary tube projects, an overflow vessel surrounding the receiver and an air outlet pipe connecting said receiver and overflow vessel with the exterior of the vessel and surrounding a thermometer extending into the receiver.

In testimony whereof I affix my signature.

Dr. HANS EDGAR RICHARD VOGEL. [L. S.]